Jan. 27, 1959          G. T. MAHLER          2,870,869
RECOVERY OF TITANIUM TETRACHLORIDE
Filed April 18, 1957          2 Sheets-Sheet 1
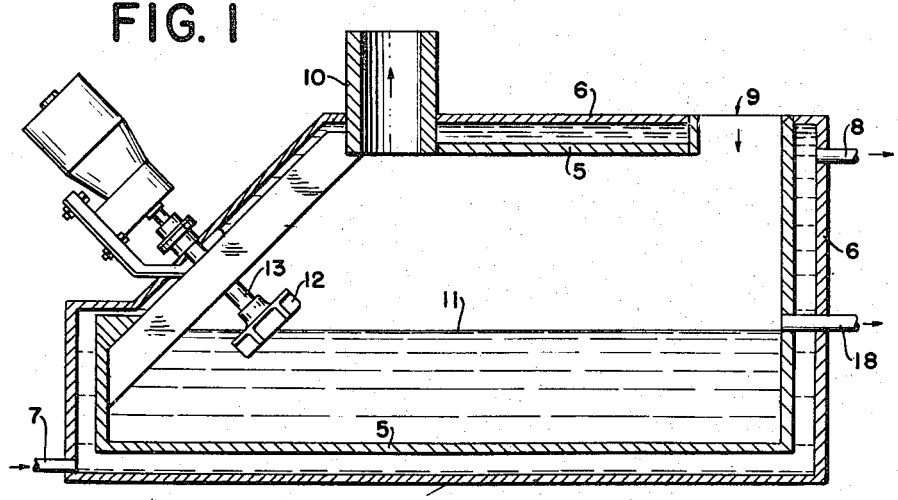
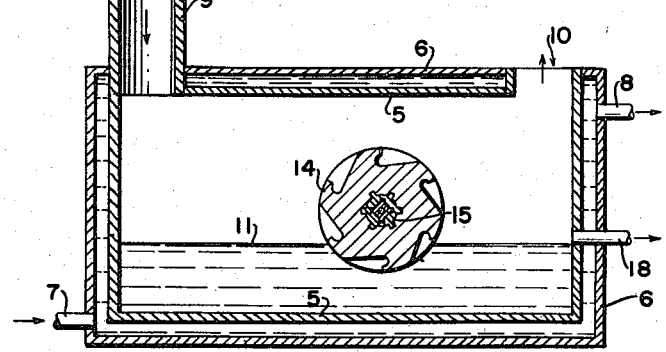
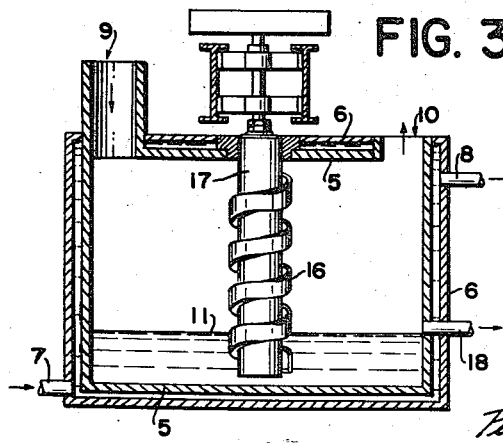
INVENTOR
GEORGE T. MAHLER
BY
ATTORNEYS

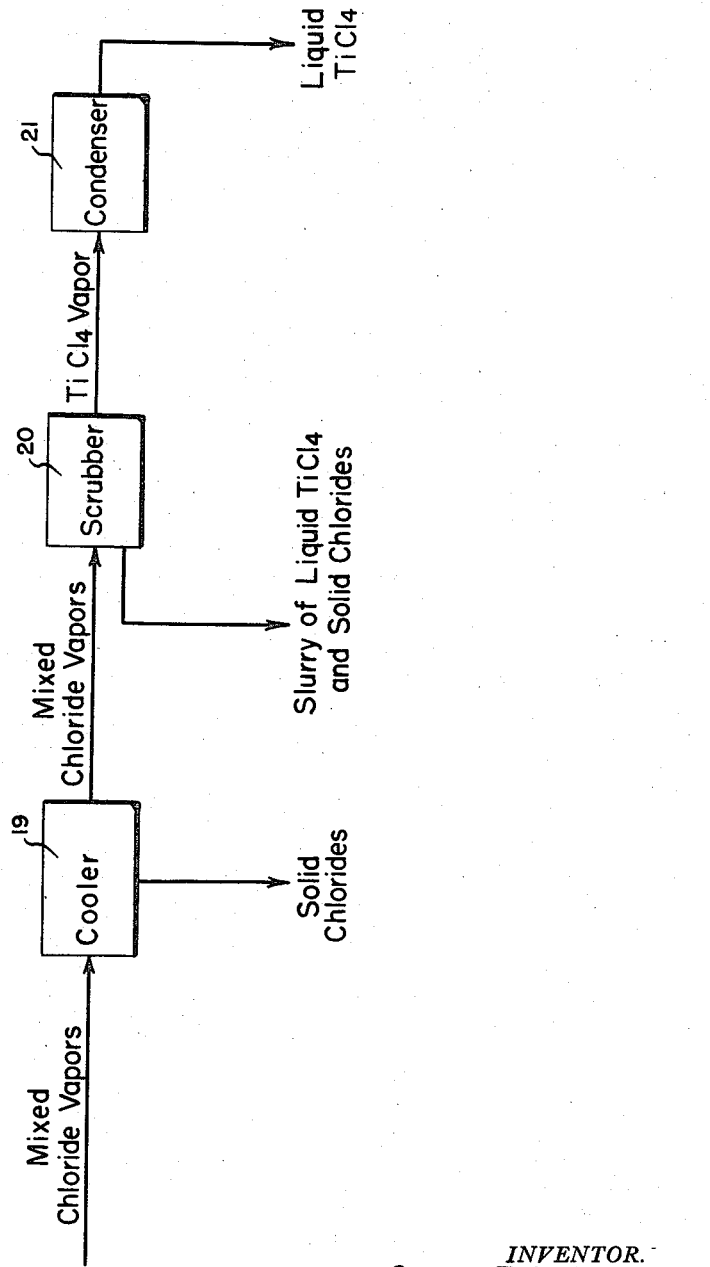

United States Patent Office 2,870,869
Patented Jan. 27, 1959

2,870,869
RECOVERY OF TITANIUM TETRACHLORIDE

George T. Mahler, Palmerton, Pa., assignor to The New Jersey Zinc Company, New York, N. Y., a corporation of New Jersey Application April 18, 1957, Serial No. 653,650

9 Claims. (Cl. 183—120)

This invention relates to the production of titanium tetrachloride and, more particularly, to the recovery of titanium tetrachloride from a gaseous admixture with other contaminating metal chlorides.

The method of producing titanium tetrachloride generally considered to be the most effective and economical comprises high temperature chlorination of a titanium oxide-containing material. This is usually effected by passing chlorine gas through a porous charge composed essentially of an intimate mixture of titaniferous material such as rutile or ilmenite and carbonaceous material such as coke at a temperature of at least about 700° C. The primary products of the chlorination reaction are gaseous titanium tetrachloride and carbon monoxide, but this product is seriously contaminated with chlorides of other metals such as iron and aluminum which are indigenous to the titaniferous material. All such impurities must be removed if the titanium tetrachloride is to be used as a starting material for the production of titanium metal.

The metal chlorides which thus contaminate the titanium tetrachloride produced by chlorination of an oxidic titaniferous material include ferrous chloride, ferric chloride and aluminum trichloride. The approximate dew points of these chlorides in a typical mixture are as follows:

|       | ° C.  |
|-------|-------|
| $FeCl_2$ | 725   |
| $FeCl_3$ | 250   |
| $AlCl_3$ | 125   |
| $TiCl_4$ | 88–90 |

It is inescapable therefore that the iron and aluminum chlorides begin to condense prior to the titanium tetrachloride when a gaseous mixture of the chlorides is cooled. The iron and aluminum chlorides condense directly into solid particles whereas the titanium tetrachloride condenses to a liquid. The solid particles of iron and aluminum chlorides are sticky when dry, are more sticky when wetted with liquid titanium tetrachloride, and are even more sticky in the dry or wet stage when any moisture introduced or formed in the chlorinator forms the hydrates of the iron and aluminum chlorides. Inasmuch as the effects of this stickiness are most pronounced in condensing and related handling equipment for the liquid titanium tetrachloride, it is generally preferred practice to cool the gaseous product of the chlorination operation sufficiently to condense as much as possible of the iron and aluminum chlorides in the dry state before condensing the titanium tetrachloride. However, it has been found to be virtually impossible to effect complete separation of the iron and aluminum chlorides from the titanium tetrachloride by this means, and consequently the condensation of the titanium tetrachloride has always been accompanied by the formation of a considerable amount of finely divided solid particles of iron and aluminum chlorides.

Condensation of titanium tetrachloride can be achieved effectively by passing the tetrachloride vapor through a spray of the liquified tetrachloride. The amount of liquid tetrachloride required to effectively condense the tetrachloride vapor is, of course, affected by the temperatures of the incoming vapor and of the cool liquid tetrachloride and by the desired final gas temperaure, but in a specific spray condenser operation an amount of liquid tetrachloride was required about forty times that of the tetrachloride vapor which was thereby condensed. Consequently, a large volume of liquid titanium tetrachloride must be clarified, cooled and recirculated through the spray condenser. The problem is greatly aggravated by the fact that the solid iron and aluminum chlorides formed along with the condensation of the titanium tetrachloride must be separated from the liquid tetrachloride before the latter is recirculated in order to prevent settling and line blockage by the solid chlorides. The operation of a heat interchanger and its associated equipment to cool the recirculated liquid tetrachloride is especially troublesome when the solid iron and aluminum chlorides are present. The equipment, handling time and inventory required to effect this separation of the solid chlorides from the recirculated titanium tetrachloride has proven to be a burdensome obstacle in commercial scale production of titanium tetrachloride.

I have now discovered that it is possible to substantially completely remove all of the iron and aluminum chlorides from the gaseous titanium tetrachloride in such manner that the major portion of the titanium tetrachloride can be subsequently condensed without the complications introduced by the presence of iron and aluminum chlorides. I have found that this result can be achieved by scrubbing the reaction gas carrying iron and aluminum chlorides either in the form of their vapors or as a mixture thereof in their vapor and solid forms with a slurry of the solid iron and aluminum chlorides suspended in liquid titanium tetrachloride, the slurry being moved with violence through the incoming gaseous stream of iron, aluminum and titanium chlorides. Thus, the method of my invention comprises passing the gaseous mixture of titanium tetrachloride with one or more of the aforementioned normally solid chlorides, to wit ferrous chloride, ferric chloride and aluminum trichloride, through a scrubbing chamber having in the bottom thereof a body of a slurry of the solid iron and aluminum chlorides suspended in liquid titanium tetrachloride. The slurry is hurled throughout the chamber with such violence as to provide by itself and by its splashing against the interior surfaces of the chamber a turbulent shower of the slurry through which the gaseous mixture passes. The slurry is maintained at a temperature close to but below the dew point of the titanium tetrachloride so as to remove substantially all of the aforementioned normally solid chlorides from admixture with the remaining gaseous titanium tetrachloride without condensing all of the tetrachloride. The remaining uncondensed iron- and aluminum-free titanium tetrachloride is thereafter condensed and recovered.

The scrubbing operation in the method of my invention is wholly different from the type of scrubbing obtained by a conventional scrubbing spray. For one thing, a conventional spray scrubber does not deliver the spray with marked violence and hence there is no splashing and bathing of the interior surfaces of the scrubber with violently moving masses of liquid. Moreover, a conventional spray device is incapable of handling a slurry of such sticky solids as iron and aluminum chlorides, particularly when these chlorides are hydrated, without serious operating difficulties. In the scrubbing operation embodied in the method of my invention, on the other hand, the slurry is lifted out of the body thereof in the bottom of the scrubber chamber and is hurled about with sufficient violence to splash against the interior surfaces of the chamber. Furthermore, in many conventional scrubbers, the most effective removal of solids from the gas stream is only accomplished when the exit gas pressure is considerably lower than the inlet pressure. Since titanium tetrachloride is an extremely reactive material, it is highly advantageous to maintain as low a pressure change as possible throughout the system, both to prevent leakage of air into the system and leakage of noxious gases to the atmosphere. Because the scrubbing force employed in the embodiment of my invention is externally applied, and does not depend on a relatively large pressure change of the gas being scrubbed, very low pressure drops, measurable in hundredths of an inch, are attainable. It is not fully understood at present how such a shower of the slurry can be so completely effective in removing the iron and aluminum chlorides from the titanium tetrachloride vapor, but it appears possible that condensation of a minor proportion of titanium tetrachloride from the incoming gases tends to condition the normally solid iron and aluminum chlorides so that they are readily assimilated on impact with the showering droplets of slurry and thus removed from the gas stream.

The method of my invention provides a further advantage in that the normally solid iron and aluminum chlorides are collected and discharged from the scrubbing device in concentrated form. If a conventional spray condenser were used to condense all of the titanium tetrachloride as well as the normally solid chlorides, a relatively low concentration of solids would be obtained. Conventional means of removing these solids by filtration or settling are inconvenient because of the reactive nature of the titanium tetrachloride, and the solids so removed still require evaporation removal of residual titanium tetrachloride before they may be further processed or discarded. In the process of my invention, the solids may be discharged with liquid titanium tetrachloride in concentrations ranging up to about 40%, and may advantageously be fed directly to conventional sludge drying equipment for removal and recovery of the associated titanium tetrachloride.

The only requirement of the scrubbing apparatus useful for practicing the invention is that it be capable of hurling a mass of the solid chloride-liquid titanium tetrachloride slurry violently about within the scrubbing chamber. A variety of apparatus capable of accomplishing this result is shown in the accompanying drawings in which:

Fig. 1 is a sectional elevation of a form of scrubber chamber provided with a slurry-hurling rotor mounted for rotation about an oblique axis;

Fig. 2 is a sectional elevation of another form of scrubber chamber having a rotor mounted for rotation about a horizontal axis;

Fig. 3 is a sectional elevation of another modification of scrubber chamber provided with a vertically mounted rotor; and Fig. 4 is a flow diagram of one modification of a complete condensing system embodying the invention.

The scrubber chambers shown in Figs. 1, 2 and 3 comprise a substantially rectangular steel vessel 5 provided wherever practical with a steel water jacket 6. Cooling water is supplied to the jacket through an inlet line 7 and is discharged through an outlet line 8. The vessel is provided with a gas inlet 9 through which there is introduced the reaction gas carrying iron and aluminum chlorides either in the form of their vapors or as a mixture of their vapor and solid forms. The vessel is also provided with a gas outlet 10 through which the scrubbed titanium tetrachloride-containing gases, freed from iron and aluminum chlorides, are discharged. The bottom of the vessel contains a body 11 of a slurry composed essentially of liquid titanium tetrachloride and solid iron or aluminum chlorides, or both. A rotor is mounted within the vessel 5 so as to dip into the body of the slurry and so that, as the rotor is turned rapidly, it hurls portions of the slurry out of the body of slurry and into the interior of the vessel. In Fig. 1 a rotor 12 is mounted on an obliquely positioned drive shaft 13, in Fig. 2 a rotor 14 is mounted on a horizontally positioned drive shaft 15, and in Fig. 3 a screw-shaped rotor 16 is mounted on a vertically positioned drive shaft 17. Each of these drive shafts extends through at least one wall of the vessel so that it may be driven outside the vessel. The vessel is also provided with an overflow slurry discharge line 18 so as to control the volume of the slurry as fresh slurry is produced in the vessel by simultaneous condensation of some titanium tetrachlorides along with the iron and aluminum chlorides.

In operation of the scrubber chamber, the rotor, or other equivalently effective mechanical device, is driven at a sufficiently high speed to hurl portions of the body of slurry about the interior of the vessel. In the case of the rotors 12 and 14, each pocket-like portion of the rotor lifts a portion of the slurry and hurls it upwardly and outwardly into the interior of the vessel above the main body of slurry 11. In the case of a vertical screw-lift type of rotor such as the rotor 16, the slurry is lifted upwardly along the screw path of the rotor and is then hurled outwardly by centrifugal force into the gas-filled upper portion of the vessel. In each case, the slurry is thrown about with such violence that it strikes the interior surfaces of the vessel 5 and splashes and rebounds through the interior of the vessel above the body of slurry. Then, as the gaseous mixture of titanium, iron and aluminum chlorides is passed through this upper interior portion of the vessel 5, it is violently scrubbed and intimately contacted with the slurry. The violent agitation of the main body of slurry maintains the solids in the slurry in a uniform state of suspension, and the splashing of the flying slurry against the interior surfaces of the vessel, which is advantageously made of steel, constantly washes these surfaces and thus prevents an accumulation of solid iron and aluminum chlorides thereon.

The temperature of the slurry is maintained close to but below the dew point (about 88°–90° C.) of the titanium tetrachloride in the incoming gaseous mixture. In practice, I have found it desirable to maintain the temperature of the slurry at about 70° to 80° C., although still lower temperatures are effective. In general, however, the temperature of the slurry should be maintained sufficiently below the dew point of the titanium tetrachloride so that, in addition to effecting condensation of the iron and aluminum chlorides, enough titanium tetrachloride will simultaneously be condensed to maintain a suitably fluid solids-to-liquid ratio in the slurry. When the temperature of the slurry more closely approaches the dew point of the titanium tetrachloride in the gas mixture, for example to within 1° to 2° C. below the dew point, substantially only the solid chlorides are removed in the scrubber and the solids-to-liquid ratio in the slurry must be occasionally re-adjusted to maintain its fluidity. However, when the slurry temperature is maintained significantly below but still close to the dew point of the titanium tetrachloride, some titanium tetrachloride will be condensed along with the iron and aluminum chlorides so as to constantly produce a slurry of desirable fluidity containing up to about 40% solids. The slurry is then discharged from the vessel through the discharge line 18 at the same rate that it is formed within the scrubber. The necessary temperature control of the slurry is readily achieved by control of the cooling water flow through the cooling jacket 6. The substantially constant bathing of the inner surfaces of the vessel 5 by the slurry being hurled about therewithin insures efficient heat transfer between the slurry and the cooling water flowing through the jacket.

The following example is illustrative of the practice of my invention:

A titanium slag concentrate was chlorinated by the procedure described in United States Patent No.

2,723,903 with resulting production of a titanium tetrachloride-containing gaseous mixture containing 54% titanium tetrachloride, 4.5 ferrous chloride, 6.5% ferric chloride and 4.5% aluminum trichloride (all percentages being by weight), along with carbon monoxide, carbon dioxide, nitrogen, hydrogen chloride, and small amounts of such other chlorides as silicon tetrachloride, vanadium oxychloride, etc. This gaseous mixing leaving the chlorinator at a temperature of about 700° C. was first passed at the rate of about 190 cubic feet per minute (measured at 700° C.) through a water cooled gas-cooling tower in which the temperature of the gas mixture was lowered to about 125° C. with precipitation of about 70% by weight of the iron and aluminum chlorides content of the mixture.

The thus-cooled gaseous mixture, containing some suspended solid particles of the iron and aluminum chlorides, was then passed through a scrubber chamber such as that shown in Fig. 1 containing a slurry of the solid iron and aluminum chlorides in liquid titanium tetrachloride having a solids content of about 23% by weight. The slurry was maintained at a temperature of about 75° C. by control of the water flow through the cooling jacket. The rotor, which had a diameter of about 14 inches, was rotated at a speed of 480 revolutions per minute. All of the iron and aluminum chloride vapors in the entrance mixture were converted to the solid state along with about 45% of the titanium tetrachloride content of the entrance gaseous mixture. The liquid titanium tetrachloride further contained in solution some aluminum, iron, silicon and other chlorides. The iron and aluminum chlorides collected in the scrubber, including those suspended in the incoming gases as well as those condensed in the scrubber, together with the portion of titanium tetrachloride condensed to the liquid state, were incorporated in, and thus augmented, the body of slurry in the scrubber. A portion of the resulting slurry was therefore drawn off at a rate sufficient to maintain a substantially uniform amount of slurry in the vessel, and this withdrawn slurry was delivered to a conventional sludge drier wherein the titanium tetrachloride component of the slurry was volatilized and recovered in a conventional condenser.

The titanium tetrachloride-containing effluent gas mixture from the scrubber was substantially completely free of iron and aluminum chlorides and left at a temperature of about 75° C. This titanium tetrachloride was delivered to a conventional spray condenser in the form of a tower. The spray consisted of liquid titanium tetrachloride recirculated at the rate of 35 gallons per minute and was cooled to maintain a spray temperature of about 20° C. A portion of the liquid titanium tetrachloride was withdrawn at a rate equal to its rate of condensation from the incoming gaseous mixture. The recirculated liquid titanium tetrachloride was virtually free of solid iron and aluminum chlorides and no provision was necessary for removing these solids.

It must be understood that the method of my invention does not require the preliminary step, described in the foregoing example, of effecting partial removal of the iron and aluminum chlorides from the titanium tetrachloride-containing gaseous mixture prior to the scrubbing operation. The scrubbing operation is fully capable of removing all of the iron and aluminum chlorides from this mixture; the preliminary cooling of the mixture to remove some of its iron and aluminum chlorides content merely lessens the load on the scrubbing vessel and on the subsequent sludge dryer. However, a similar scrubbing vessel, operated with adequate cooling water to maintain the solid chlorides-liquid titanium tetrachloride slurry below the boiling point of the tetrachloride, is a useful substitute for the preliminary gas cooling tower used in the foregoing example.

I have also found, as indicated in Fig. 4, that the conventional spray condenser used to condense the iron and aluminum-free titanium tetrachloride vapor in the foregoing example is advantageously replaced by a condenser operated like my novel scrubber except that substantially solids-free liquid titanium tetrachloride is used in lieu of the solid chloride-liquid titanium tetrachloride slurry and the liquid tetrachloride is maintained at a lower temperature generally below about 35° C. The combination of these novel scrubbing and condensing operations i. e., a cooling chamber 19, a scrubbing chamber 20 and a condensing chamber 21, makes possible a titanium tetrachloride recovery system substantially free of any special precaution to prevent line blockage or equipment fouling by deposits or accretions of solid iron or aluminum chlorides.

Although the practice of my invention has been illustrated herein in connection with the recovery of titanium tetrachloride from the reaction products of the chlorination of a titanium slag concentrate, my process is equally applicable to the treatment of titanium tetrachloride-containing products from the chlorination of other titaniferous materials such as rutile and ilmenite. It is significant to note that the method of my invention is capable of handling the problem of separating iron chlorides from these gases so effectively that it is now possible to recover titanium tetrachloride from gaseous mixtures thereof containing relatively large amounts of iron chloride, as is the case when ilmenite is used as the raw material for the chlorination operation.

I claim:

1. The method of recovering titanium tetrachloride from a gaseous mixture of the titanium tetrachloride with at least one of the normally solid chlorides of the group consisting of ferrous chloride, ferric chloride and aluminum chloride which comprises passing the gaseous mixture through a scrubbing chamber having in the bottom thereof a body of a slurry of said solid chlorides suspended in liquid titanium tetrachloride, hurling a substantially continuous shower of said slurry throughout the chamber with such violence as to provide by itself and by its splashing against the interior surfaces of the chamber a turbulent shower of the slurry through which the gaseous mixture passes, the slurry being maintained at a temperature close to but below the dew point of the titanium tetrachloride so as to remove substantially all of said normally solid chlorides from admixture with the remaining gaseous titanium tetrachloride without condensing all of the gaseous titanium tetrachloride, and thereafter condensing and recovering the resulting iron- and aluminum-free titanium tetrachloride from the gaseous effluent from the scrubbing operation.

2. The method of recovering titanium tetrachloride from a gaseous mixture of the titanium tetrachloride with at least one of the normally solid chlorides of the group consisting of ferrous chloride, ferric chloride and aluminum chloride which comprises passing the gaseous mixture through a scrubbing chamber having in the bottom thereof a body of a slurry of said solid chlorides suspended in liquid titanium tetrachloride, hurling a substantially continuous shower of said slurry upwardly throughout the chamber with such violence as to provide by itself and by its splashing against the interior surfaces of the chamber a turbulent shower of the slurry through which the gaseous mixture passes, the slurry being maintained at a temperature close to but below the dew point of the titanium tetrachloride so as to remove substantially all of said normally solid chlorides from admixture with the remaining gaseous titanium tetrachloride without condensing all of the gaseous titanium tetrachloride, and thereafter condensing and recovering the resulting iron and aluminum-free titanium tetrachloride from the gaseous effluent from the scrubbing operation.

3. The method of recovering titanium tetrachloride from a gaseous mixture of the titanium tetrachloride with at least one of the normally solid chlorides of the group consisting of ferrous chloride, ferric chloride and aluminum chloride which comprises cooling the mixture to a temperature below the lowest dew point of said normally solid chlorides but above the dew point of the titanium tetrachloride so as to separate from the gaseous titanium tetrachloride at least a portion of the solid chlorides substantially free from liquid titanium tetrachloride, passing the resulting gaseous mixture through a scrubbing chamber having in the bottom thereof a body of a slurry of said solid chlorides suspended in liquid titanium tetrachloride, hurling a substantially continuous shower of said slurry throughout the chamber with such violence as to provide by itself and by its splashing against the interior surfaces of the chamber a turbulent shower of the slurry through which the gaseous mixture passes, the slurry being maintained at a temperature close to but below the dew point of the titanium tetrachloride so as to remove substantially all of said normally solid chlorides from admixture with the remaining gaseous titanium tetrachloride without condensing all of the gaseous titanium tetrachloride, and thereafter condensing and recovering the resulting iron- and aluminum-free titanium tetrachloride from the gaseous effluent from the scrubbing operation.

4. The method of recovering titanium tetrachloride from a gaseous mixture of the titanium tetrachloride with at least one of the normally solid chlorides of the group consisting of ferrous chloride, ferric chloride and aluminum chloride which comprises passing the gaseous mixture through a scrubbing chamber having in the bottom thereof a body of a slurry of said solid chlorides suspended in liquid titanium tetrachloride, hurling a substantially continuous shower of said slurry throughout the chamber with such violence as to provide by itself and by its splashing against the interior surfaces of the chamber a turbulent shower of the slurry through which the gaseous mixture passes, the slurry being maintained at a temperature within the range of 70° to 80° C. so as to remove substantially all of said normally solid chlorides from admixture with the remaining gaseous titanium tetrachloride without condensing all of the gaseous titanium tetrachloride, and thereafter condensing and recovering the resulting iron- and aluminum-free titanium tetrachloride from the gaseous effluent from the scrubbing operation.

5. The method of recovering titanium tetrachloride from a gaseous mixture of the titanium tetrachloride with at least one of the normally solid chlorides of the group consisting of ferrous chloride, ferric chloride and aluminum chloride which comprises passing the gaseous mixture through a scrubbing chamber having in the bottom thereof a body of a slurry of said solid chlorides suspended in liquid titanium tetrachloride, hurling a substantially continuous shower of said slurry throughout the chamber with such violence as to provide by itself and by its splashing against the interior surfaces of the chamber a turbulent shower of the slurry through which the gaseous mixture passes, the slurry being maintained at a temperature close to but below the dew point of the titanium tetrachloride so as to remove substantially all of said normally solid chlorides from admixture with the remaining gaseous titanium tetrachloride without condensing all of the gaseous titanium tetrachloride and thus form a slurry containing up to about 40% of the solid chlorides in the liquid tetrachloride, and thereafter condensing and recovering the resulting iron- and aluminum-free titanium tetrachloride from the gaseous effluent from the scrubbing operation.

6. The method of recovering titanium tetrachloride from a gaseous mixture of the titanium tetrachloride with at least one of the normally solid chlorides of the group consisting of ferrous chloride, ferric chloride and aluminum chloride which comprises passing the gaseous mixture through a scrubbing chamber having in the bottom thereof a body of a slurry of said solid chlorides suspended in liquid titanium tetrachloride, hurling a substantially continuous shower of said slurry throughout the chamber with such violence as to provide by itself and by its splashing against the interior surfaces of the chamber a turbulent shower of the slurry through which the gaseous mixture passes, water cooling the exterior surfaces of the scrubbing chamber so as to maintain the slurry at a temperature close to but below the dew point of the titanium tetrachloride and thus remove substantially all of said normally solid chlorides from admixture with the remaining gaseous titanium tetrachloride without condensing all of the gaseous titanium tetrachloride, and thereafter condensing and recovering the resulting iron- and aluminum-free titanium tetrachloride from the gaseous effluent from the scrubbing operation.

7. The method of recovering titanium tetrachloride from a gaseous mixture of the titanium tetrachloride with at least one of the normally solid chlorides of the group consisting of ferrous chloride, ferric chloride and aluminum chloride which comprises passing the gaseous mixture through a scrubbing chamber having in the bottom thereof a body of a slurry of said solid chlorides suspended in liquid titanium tetrachloride, hurling a substantially continuous shower of said slurry throughout the chamber with such violence as to provide by itself and by its splashing against the interior surfaces of the chamber a turbulent shower of the slurry through which the gaseous mixture passes, the slurry being maintained at a temperature close to but below the dew point of the titanium tetrachloride so as to remove substantially all of said normally solid chlorides from admixture with the remaining gaseous titanium tetrachloride without condensing all of the gaseous titanium tetrachloride, and thereafter condensing and recovering the titanium tetrachloride from the gaseous effluent from the scrubbing operation by passing said effluent through a substantially continuous shower of substantially solids-free liquid titanium tetrachloride hurled about in a condensing chamber with such violence as to provide by itself and by its splashing against the interior surfaces of the chamber a turbulent shower of liquid titanium tetrachloride, the temperature of the liquid titanium tetrachloride being maintained below about 35° C.

8. The method of recovering titanium tetrachloride from a gaseous mixture of the titanium tetrachloride with at least one of the normally solid chlorides of the group consisting of ferrous chloride, ferric chloride and aluminum chloride which comprises passing the gaseous mixture through a scrubbing chamber having in the bottom thereof a body of a slurry of said solid chlorides suspended in liquid titanium tetrachloride with a solids content up to about 40%, hurling a substantially continuous shower of said slurry throughout the chamber with such violence as to provide by itself and by its splashing against the interior surfaces of the chamber a turbulent shower of the slurry through which the gaseous mixture passes, the slurry being maintained at a temperature close to but below the dew point of the titanium tetrachloride so as to remove substantially all of said normally solid chlorides from admixture with the remaining gaseous titanium tetrachloride without condensing all of the gaseous titanium tetrachloride, and thereafter condensing and recovering the titanium tetrachloride from the gaseous effluent from the scrubbing operation.

9. The method of recovering titanium tetrachloride from a gaseous mixture of the titanium tetrachloride with at least one of the normally solid chlorides of the group consisting of ferrous chloride, ferric chloride and aluminum chloride which comprises cooling the mixture to a temperature below the dew point of each of said normally solid chlorides but above the dew point of the titanium tetrachloride so as to separate from the gaseous titanium tetrachloride at least a portion of the solid chlorides substantially free from liquid titanium tetrachloride, passing the resulting gaseous mixture through a scrubbing chamber having in the bottom thereof a body of a slurry of said solid chlorides suspended in liquid titanium tetrachloride, hurling a substantially continuous shower of said slurry throughout the chamber with such violence as to provide by itself and by its splashing against the interior surfaces of the chamber a turbulent shower of the slurry through which the gaseous mixture passes, the slurry being maintained at a temperature close to but below the dew point of the titanium tetrachloride so as to remove substantially all of said normally solid chlorides from admixture with the remaining gaseous titanium tetrachloride without condensing all of the gaseous titanium tetrachloride, and thereafter condensing and recovering the titanium tetrachloride from the gaseous effluent from the scrubbing operation by passing said effluent through a substantially continuous shower of substantially solids-free liquid titanium tetrachloride hurled about in a condensing chamber with such violence as to provide by itself and by its splashing against the interior surfaces of the chamber a turbulent shower of liquid titanium tetrachloride, the temperature of the liquid titanium tetrachloride being maintained below about 35° C.

References Cited in the file of this patent
UNITED STATES PATENTS

| | | |
|---|---|---|
| 2,457,546 | Handwerk et al. | Dec. 28, 1948 |
| 2,668,754 | Lichtenfels | Feb. 9, 1954 |
| 2,675,890 | Frey et al. | Apr. 20, 1954 |
| 2,792,077 | Mas et al. | May 14, 1957 |